United States Patent
Martell

(10) Patent No.: US 11,981,160 B2
(45) Date of Patent: May 14, 2024

(54) REVERSIBLE MULTI-PIECE WHEELS FOR DIRECTIONAL TIRES

(71) Applicant: Austin Daniel Martell, Lake Worth, FL (US)

(72) Inventor: Austin Daniel Martell, Lake Worth, FL (US)

( * ) Notice: Subject to any disclaimer, the term of this patent is extended or adjusted under 35 U.S.C. 154(b) by 352 days.

(21) Appl. No.: 17/087,311

(22) Filed: Nov. 2, 2020

(65) Prior Publication Data

US 2021/0129578 A1     May 6, 2021

Related U.S. Application Data

(60) Provisional application No. 62/929,825, filed on Nov. 2, 2019.

(51) Int. Cl.
*B60B 3/04*          (2006.01)
*B60B 3/10*          (2006.01)

(52) U.S. Cl.
CPC ............. *B60B 3/044* (2013.01); *B60B 3/10* (2013.01); *B60B 2310/305* (2013.01)

(58) Field of Classification Search
CPC .......... B60B 3/04; B60B 3/041; B60B 3/042; B60B 3/044; B60B 3/045; B60B 3/047; B60B 3/10; B60B 23/06; B60B 23/10; B60B 2310/305; B60B 1/14
See application file for complete search history.

(56) References Cited

U.S. PATENT DOCUMENTS

| | | | | |
|---|---|---|---|---|
| 1,398,558 A * | 11/1921 | Lachman | ................... | B60B 1/00 301/79 |
| 2,272,889 A * | 2/1942 | Brink | ....................... | B60B 23/12 301/24 |
| 6,439,671 B1 * | 8/2002 | Lehnhardt | ............... | B21C 23/14 29/894.341 |
| 6,595,595 B1 * | 7/2003 | Hui | ......................... | B60B 23/10 301/95.101 |

(Continued)

FOREIGN PATENT DOCUMENTS

DE           3345638 A1 *    6/1985  ............. B60B 3/044

OTHER PUBLICATIONS

Machine Translation of DE 3345638 A1, 17 pages (Year: 1985).*

*Primary Examiner* — S. Joseph Morano
*Assistant Examiner* — Emily G. Castonguay
(74) *Attorney, Agent, or Firm* — Ingram IP Law, P.A.

(57) ABSTRACT

The technology provides a multi-piece wheel for a vehicle that is disassembled to laterally rotate directional tires without needing to dismount a tire from a rim. The multi-piece wheel includes a rim housing with threaded apertures provided at side edges proximate to an outboard flange and an inboard flange. The multi-piece wheel includes a face that is removably coupled to the rim housing, the face having a bore that centers the face on an axle hub, a disk that is concentric with the bore; and spokes that are mechanically coupled to the disk and extend outwardly therefrom, the spokes having apertures at an end opposite to the disk that align with the threaded apertures in the rim housing. The multi-piece wheel further includes a fastener that releasably couples the face and the rim housing and a secondary fastening mechanism that mechanically engages the spokes and the rim housing.

20 Claims, 6 Drawing Sheets

(56) References Cited

U.S. PATENT DOCUMENTS

| | | | |
|---|---|---|---|
| 7,681,958 B1 * | 3/2010 | Bagdasarian | B60B 1/14 301/67 |
| 2004/0066086 A1 * | 4/2004 | Yoshimura | B60B 3/10 301/95.108 |
| 2015/0076895 A1 * | 3/2015 | Clemens | B60B 3/044 301/9.2 |
| 2015/0273934 A1 * | 10/2015 | Huidekoper | B60B 25/002 301/11.1 |
| 2016/0318335 A1 * | 11/2016 | Werner | B60B 23/02 |

* cited by examiner

REVERSIBLE MULTI-PIECE WHEELS FOR DIRECTIONAL TIRES

CROSS REFERENCE TO RELATED APPLICATIONS

This application claims priority to U.S. Provisional Patent Application No. 62/929,825 filed on Nov. 2, 2019, the complete disclosure of which is incorporated herein by reference in its entirety.

FIELD OF THE TECHNOLOGY

The present technology broadly relates to vehicle wheels and more specifically to multi-piece wheels having a face that detaches from a rim housing to facilitate lateral tire rotation.

BACKGROUND OF THE TECHNOLOGY

High performance vehicles typically include rear wheel drive vehicles. These vehicles may be used for everyday driving and are engineered with high performance components such as suspension, tires, wheels, brakes, steering, and the like.

Tires mounted on the front and the rear wheels of a vehicle experience different acting forces and may be sized differently. Wheel and tire selection impacts vehicle handling including cornering, braking, and power transfer to the road. High performance vehicles are generally designed with camber at the rear wheels to improve cornering. However, camber causes inner tire wear that is not correctable by re-alignment. Additionally, high performance vehicles may be designed with slight oversteer so that the rear wheels begin to skid or slip just prior to the front wheels losing grip. Oversteer may be controlled using staggered wheels, where the wheels mounted on the front of the vehicle are a different size than the wheels mounted on the rear of the vehicle. For example, larger wheels may be mounted on the rear axle to provide more power to the road and to counteract a tendency for the rear end to swing out.

Vehicle stability or balance may be modified by changing a relationship of wheel dimensions between the front and rear wheels. For example, staggered fitment may be used to adjust a slipping point of the rear and front wheels. One downside to staggered fitment is foregoing an ability to rotate directional vehicle tires, which promotes even tire wear and maximizes tread life.

BRIEF DESCRIPTION OF THE FIGURES

Implementations of the technology will now be described, by way of example only, with reference to the attached figures, wherein.

DESCRIPTION OF THE TECHNOLOGY

Figure 1:
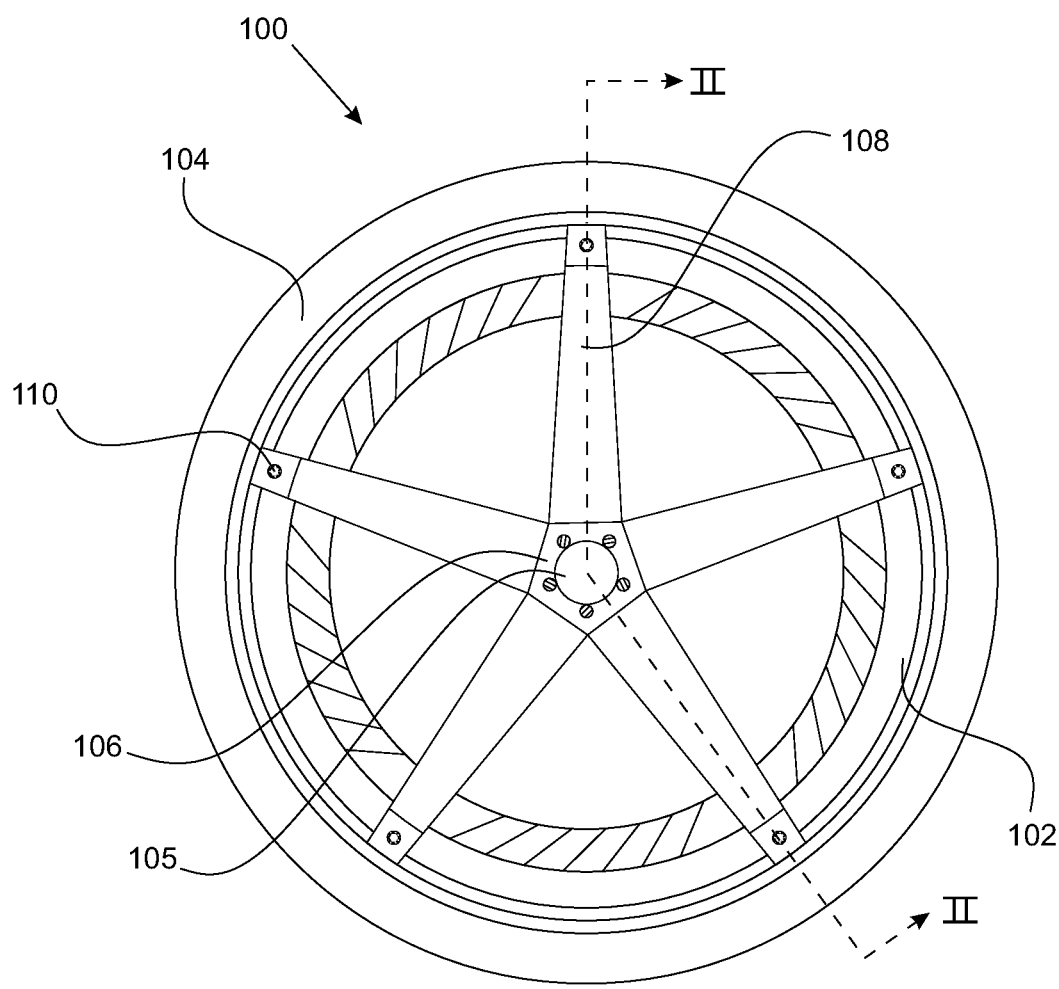
FIG. 1 illustrates a front elevation view of a multi-piece wheel having a mounted tire according to one example of the technology.

It will be appreciated that for simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, methods, procedures, and components have not been described in detail so as not to obscure the related relevant feature being described. Also, the description is not to be considered as limiting the scope of the examples described herein. The drawings are not necessarily to scale and the proportions of certain parts may have been exaggerated to better illustrate details and features of the present disclosure. Those skilled in the art with access to the teachings provided herein will recognize additional modifications, applications, and examples within the scope thereof and additional fields in which the technology would be of significant utility.

Unless defined otherwise, technical terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and means either, any, several, or all of the listed items. The terms "comprising," "including," and "having" are used interchangeably in this disclosure. The terms "comprising," "including," and "having" mean to include, but are not necessarily limited to the things so described.

The terms "connected" and "coupled" can be such that the objects are permanently connected or releasably connected. The term "substantially" is defined to be essentially conforming to the thing that it "substantially" modifies, such that the thing need not be exact. For example, substantially 2 inches (2") means that the dimension may include a slight variation.

The technology described herein provides multi-piece wheels that may be disassembled to allow lateral rotation of directional tires without needing to dismount a tire from a rim. For example, the technology described herein allows lateral rotation of a multi-piece wheel on a same axle by removing a rim and tire together as a unit. Vehicle tire rotation includes repositioning vehicle tires in a specific pattern on a fixed schedule. Performance tires are typically directional tires meaning the tire must rotate in a specified direction. Recommended rotation of directional tires traditionally involves moving tires from one axle to another axle such as from a front axle to a rear axle in order to maintain tires on a same side of a vehicle. For example, a front left tire is moved to the left-side rear axle and a rear left tire is moved to the left-side front axle. A similar rotation pattern is followed for the vehicle right side.

With staggered fitment wheels, it has not been possible to perform tire rotation in a traditional manner. Instead, tires must be physically removed from the wheels and re-mounted on lateral wheels of a same axle. The process of removing and re-mounting tires on wheels has several drawbacks that virtually eliminates this option for tire rotation. For example, tires and/or wheels may be damaged during removal and tire re-mounting. Additionally, there is increased cost for removing and re-mounting tires from wheels. Without tire rotation, inner tire wear will shorten the lifespan of staggered fitment tires. The technology described herein provides multi-piece wheels that allow lateral rotation of directional tires on a same axle without needing to dismount the tire from the rim. For example, a left rear rim and tire combination may be removed together and laterally shifted to the right rear axle. According to one example, the process involves detaching a spoke assembly from a rim and tire and transferring the rim and tire combination to an opposite side of the axle. This lateral tire rotation maintains a same directional tire rotation.

FIG. 1 illustrates a multi-piece wheel 100 according to one example. The multi-piece wheel 100 includes a rim housing 102 having a mounting structure that receives a tire 104. According to one example, the mounting structure may include a center portion, an outboard flange, and an inboard flange. According to one example, the multi-piece wheel 100 may include a face having a bore 105 that centers the face and wheel on an axle hub and a disk 106 that is concentric with the bore 105 to support the rim housing 102 via spokes 108. According to one example, the face includes spokes 108 that are mechanically coupled to the disk 106 and the rim housing 102. According to one example, the spokes 108 may include apertures 110 that receive fasteners therethrough to removably couple the face and the rim housing 102. According to one example, the apertures 110 may be provided on the spokes 108 at an end opposite from the disk 106. According to one example, the components of the multi-piece wheel 100 may be constructed from a suitable material such as a metal, a metal alloy, or the like.

Figure 2:
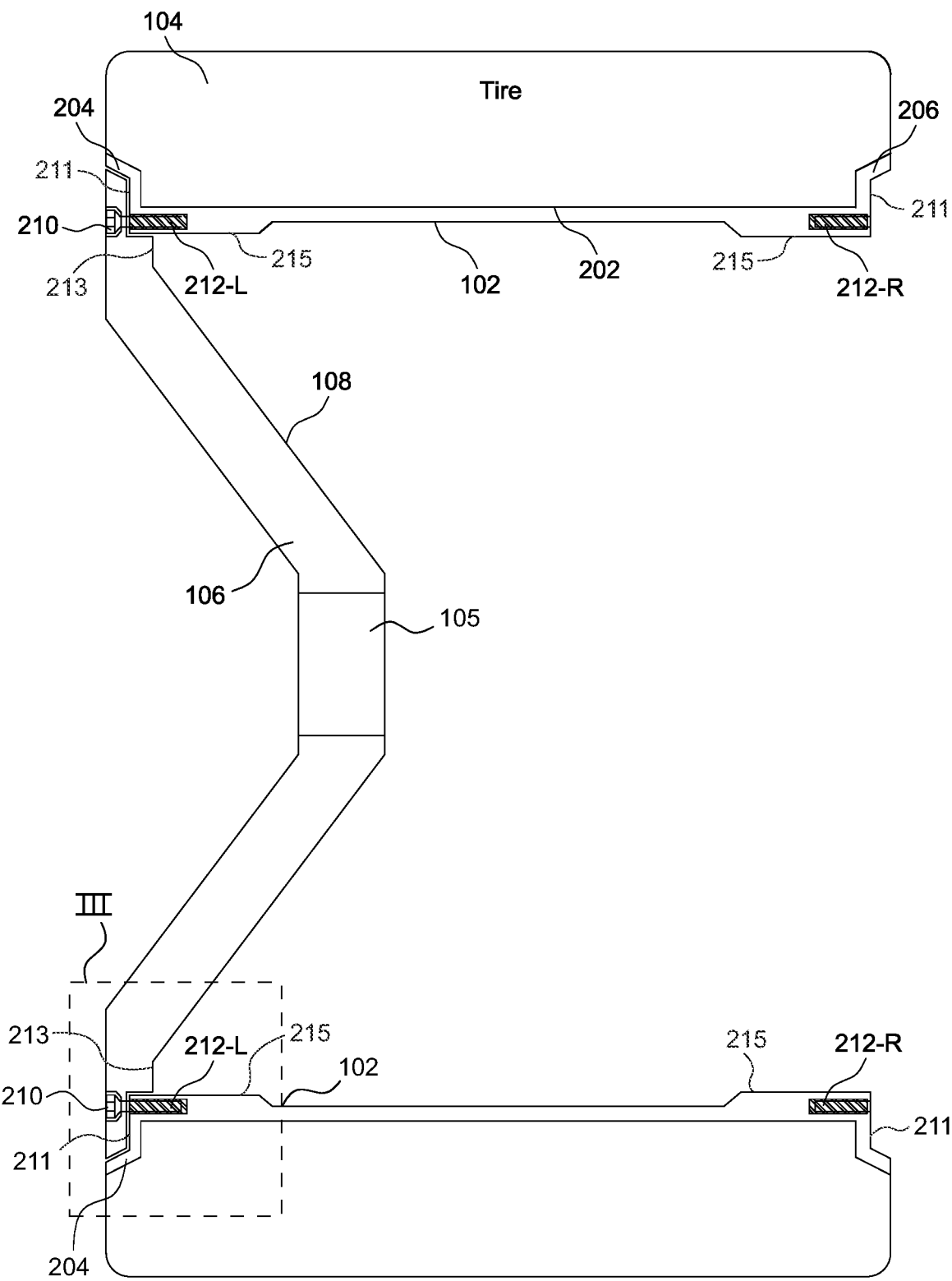
FIG. 2 illustrates a cross-sectional view of the multi-piece wheel with the mounted tire taken along line II-II of FIG. 1.

FIG. 2 illustrates a cross-sectional view of the multi-piece wheel 100 taken along line II-II illustrated in FIG. 1. According to one example, the rim housing 102 includes mounting structures for the tire 104 such as the center portion 202, the outboard flange 204, and the inboard flange 206. According to one example, the face includes the bore 105 that centers the face and multi-piece wheel on the axle hub and the disk 106 that is concentric with the bore 105 to support the rim housing 102 via spokes 108. According to one example, the face includes spokes 108 that are mechanically coupled to the disk 106 and the rim housing 102. According to one example, the spokes 108 include apertures 110 that receive fasteners 210 therethrough to removably couple the face and the rim housing 102. According to one example, the rim housing 102 may include threaded apertures 212 located at side edges 211 proximate to the outboard flange 204 and the inboard flange 206. To facilitate understanding, the apertures 212 located proximate to the outboard flange 204 are labeled 212-L and the apertures 212 located proximate to the inboard flange 206 are labeled 212-R.

Figure 3:
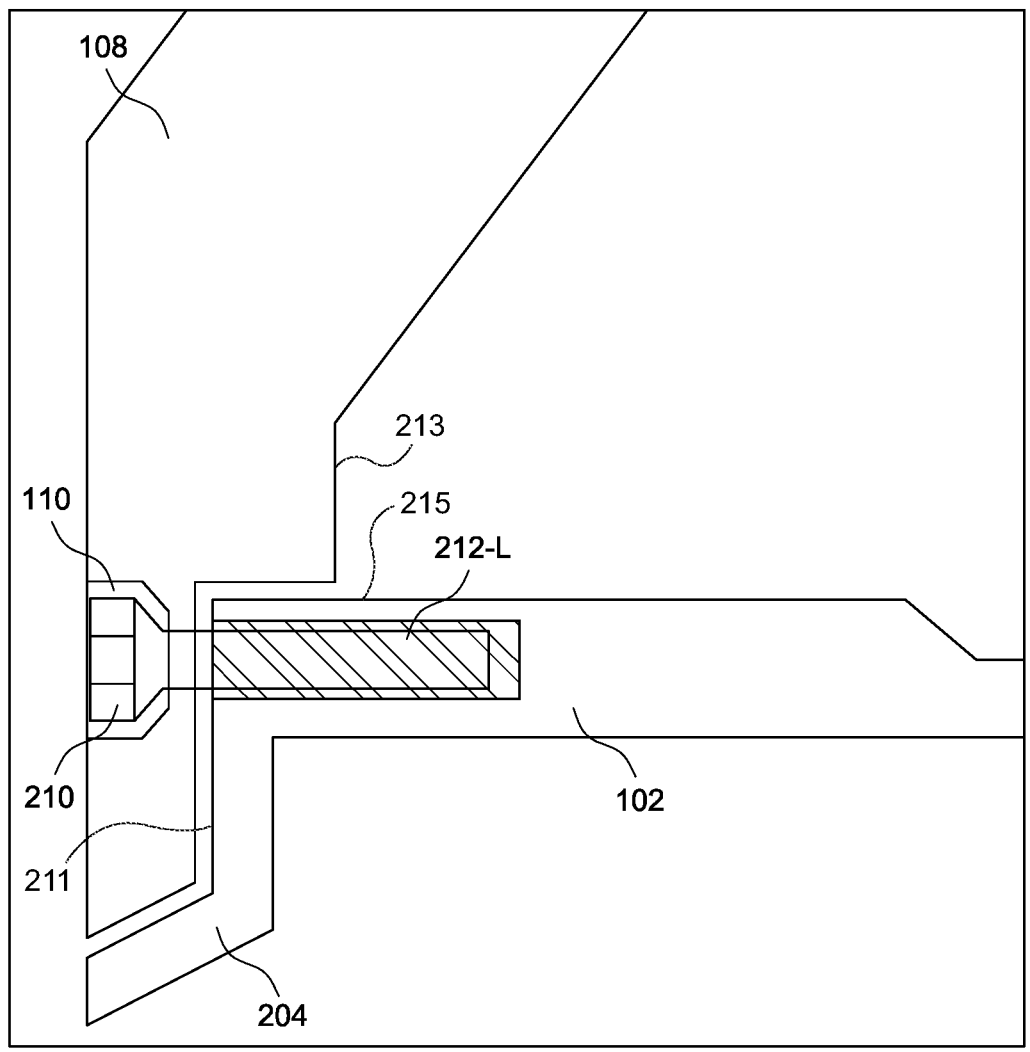
FIG. 3 illustrates a close-up view of section III depicted in FIG. 2.

FIG. 3 illustrates a close-up view of block III depicted in FIG. 2 that includes a spoke 108 having an aperture 110 that receives the fastener 210 to removably couple the spoke 108 and the rim housing 102. According to one example, the fastener 210 may include a threaded fastener such as a bolt, a screw, or the like. According to one example, the rim housing 102 may include threaded apertures 212 located at side edges 211 and positioned proximate to corresponding ones of the outboard flange 204 and the inboard flange 206. With reference to FIG. 2, the apertures 212 located proximate to the outboard flange 204 are labeled 212-L and the apertures 212 located proximate to the inboard flange 206 are labeled 212-R. One of ordinary skill in the art will readily appreciate that other fastener types may be employed to removably couple the spokes 108 and the rim housing 102.

According to one example, the threaded apertures 212 are provided at side edges 211 proximate to the outboard flange 204 and the inboard flange 206 to facilitate side-to-side or lateral rotation of directional tires. According to one example, the rims and directional tires are laterally switched with their same-sized partner rim and tire in order to remain on a same axle. Accordingly, after the lateral rotation, a left-side rear axle tire is shifted to the right-side rear axle. A similar tire rotation may be performed at the front axle. According to one example, when the rim and directional tire are placed on the left side of the vehicle, the spoke 108 is coupled to the rim housing 102 using apertures 212-L. Alternatively, when the rim and directional tire are placed on the right side of the vehicle, the spoke 108 is coupled to the rim housing 102 using apertures 212-R. In the case when the spoke 108 is coupled to the rim housing 102 using apertures 212-R, flange 204 becomes the inboard flange and flange 206 becomes the outboard flange. In this way, tires may be routinely rotated for vehicles designed with rear wheel camber for improved cornering. The technology allows tire rotation for any vehicles that benefit from side-to-side or lateral rotation of directional tires. According to one example, the technology allows vehicle owners to interchange a face with another face having a different pattern. According to one example, the technology allows vehicle owners to interchange faces while maintaining a same rim housing 102.

According to one example, the spoke end provided proximate to the rim housing 102 may be shaped to match a contour of the rim housing 102. For example, the spoke end may be shaped to match a contour of the side edge 211 that includes the threaded apertures 212. According to one example, the face may be designed so the plurality of spokes 108 frictionally engage the rim housing 102 along the side edge 211. According to one example, the spokes 108 may include a surface 213 that extends laterally across an inside circumference or an inner edge 215 of the rim housing 102.

Figure 4:
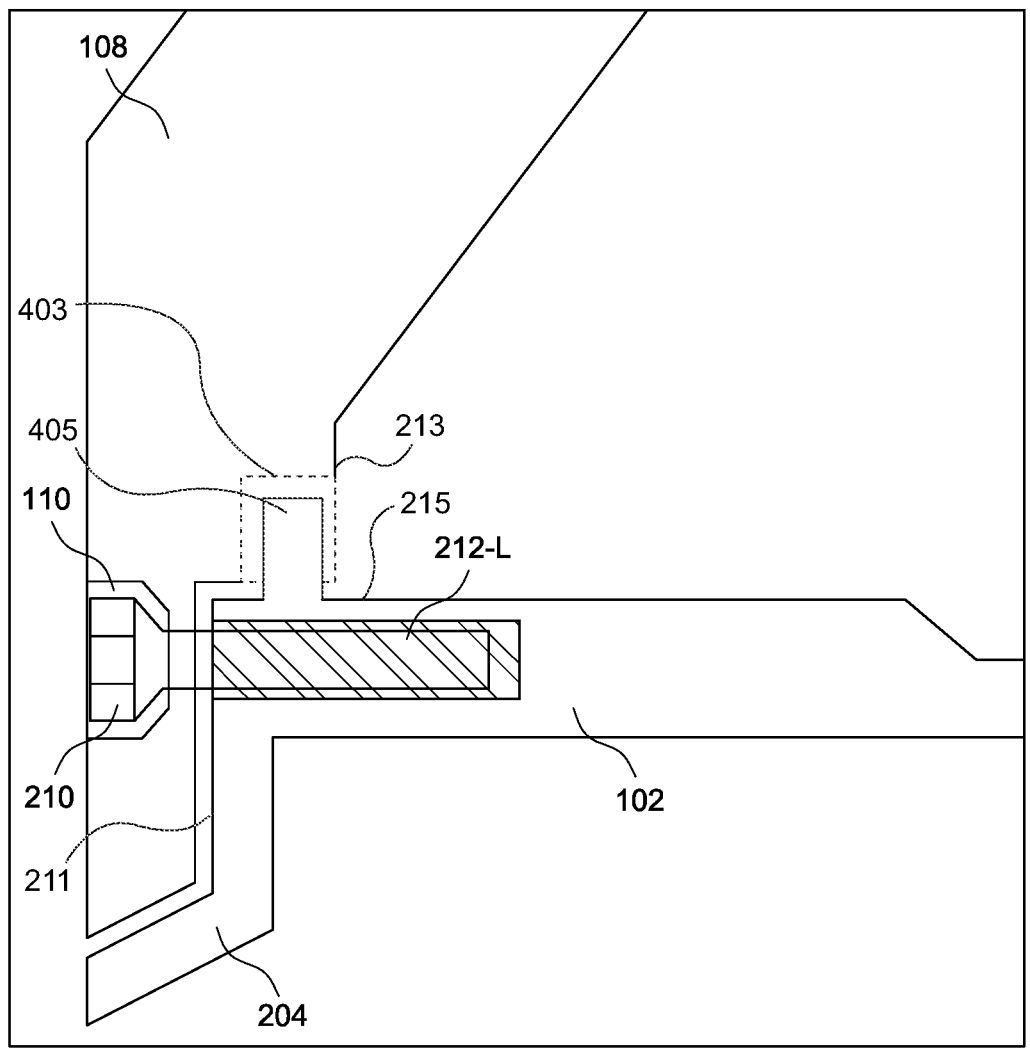
FIG. 4 illustrates a close-up view similar to FIG. 3 having a secondary fastening mechanism according to another example of the technology.

FIG. 4 illustrates another example of the multi-piece wheel 100 that includes a secondary fastening mechanism for mechanically engaging the spokes 108 and the rim housing 102. According to one example, the spokes 108 include a cavity 403 defined at surface 213 that is configured to receive a protrusion 405 that extends from the inner edge 215 of the rim housing 102. For example, the protrusion 405 may be dimensioned to fit within the cavity 403 defined at the inner edge 215 of the rim housing 102. Alternatively, the surface 213 may include a cavity that receives a protrusion that extends from the inner edge 215 of the rim housing 102. For example, the protrusion may extend toward the inner edge 215 of the rim housing 102. The secondary fastening mechanism may be employed to further counteract torsional forces applied to the multi-piece wheel during use such as during wheel rotation. One of ordinary skill in the art will readily appreciate that other fastening mechanism may be employed to mechanically engage the spokes 108 and the rim housing 102.

Figure 5:
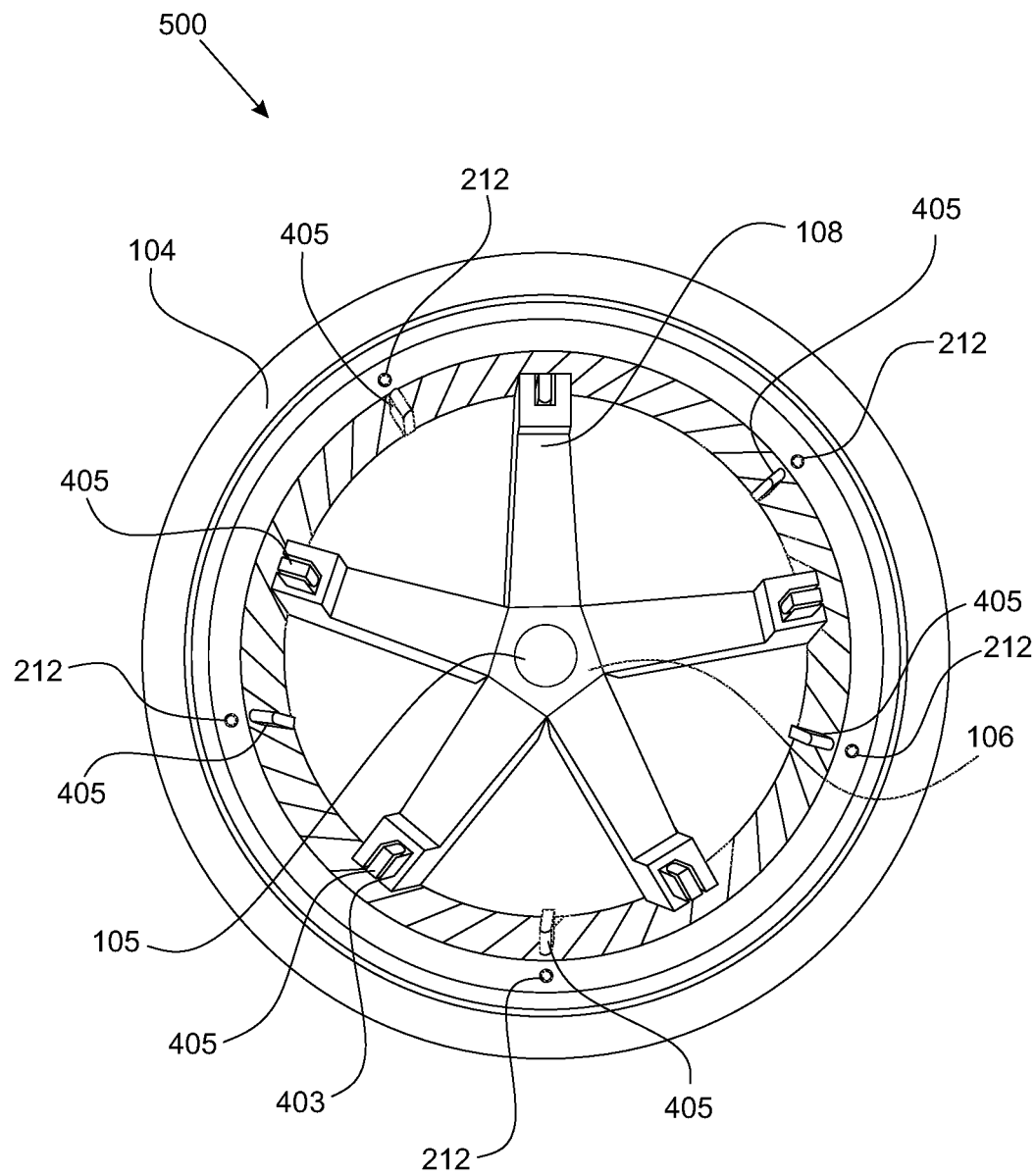
FIG. 5 illustrates a rear elevation view of a multi-piece wheel with the secondary fastening mechanism according to one example of the technology.
Figure 6:
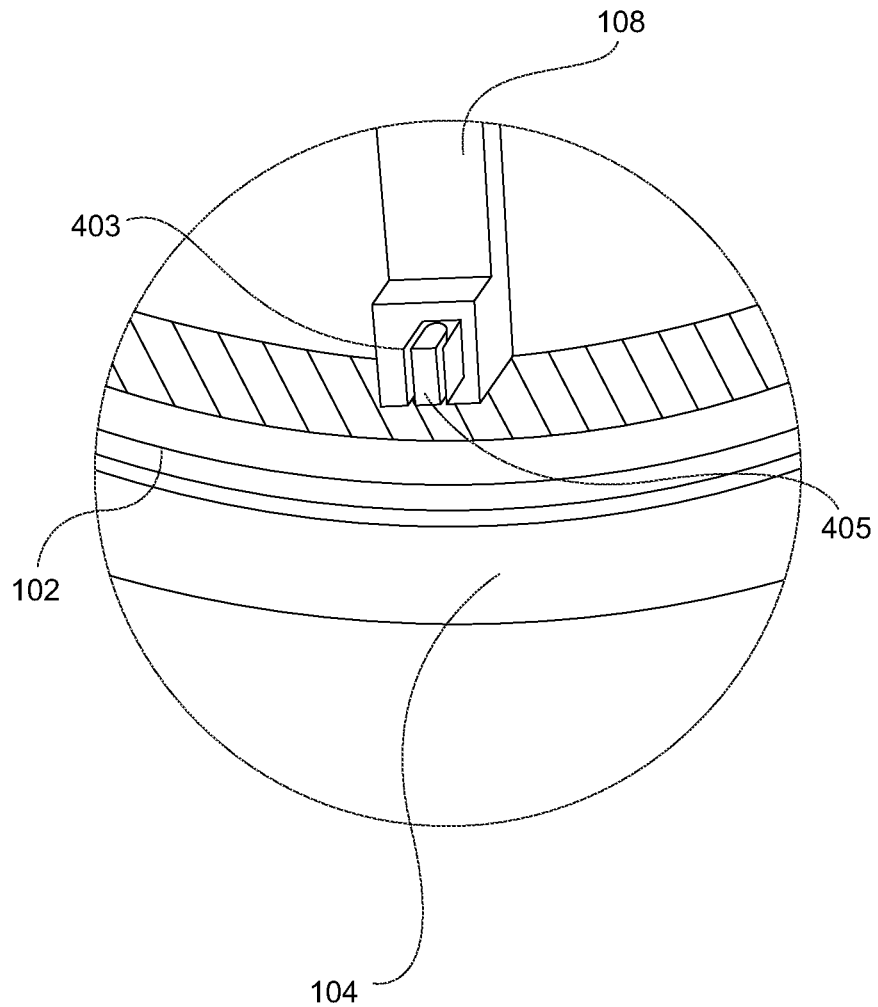
FIG. 6 illustrates a close-up view of the secondary fastening mechanism according to one example of the technology.

FIG. 5 illustrates a rear elevation view of the multi-piece wheel 500 having a secondary fastening mechanism according to one example of the technology. According to one example, the spokes 108 and the rim housing 102 may be dimensioned and contoured to mechanically and/or frictionally engage when assembled. According to one example, the rim housing 102 may include elongated protrusions 405 that correspond to cavities 403 provided at the spokes 108. FIG. 6 illustrates a close-up of the protrusion 405 dimensioned to frictionally engage the cavity 403. According to one example, the protrusions 405 may be provided on opposite sides of the rim housing 102 so that the face may be affixed to either side of the rim housing 102. FIG. 5 illustrates the protrusions 405 being offset relative to each other on opposite sides of the rim housing 102. However, one of ordinary skill in the art will readily appreciate that the protrusions 405 may be directly opposite each other or offset by any desired amount. According to one example, threaded apertures 212 may be aligned with corresponding protrusions 405 to receive fasteners 210 that removably couple the spoke 108 and the rim housing 102.

According to one example, the protrusions 405 may extend in a direction that is substantially parallel to a direction of the fastener 210. Stated differently, the protrusions 405 may extend in a direction substantially perpendicular to the side edge 211 of the rim housing 102. According to one example, the spokes 108 may include cavities 403 defined within a surface 213 that extends laterally across an inside circumference or an inner edge 215 of the rim housing 102. According to one example, the cavities 403 may extend in a same direction and along a same orientation as the protrusions 405. According to one example, a fastener may be inserted through an aperture defined through a side of the surface 213 and through an aperture defined in the protrusion 405 to mechanically engage the protrusion 405 and the surface 213.

As illustrated in FIGS. 1 and 5, the face may be oriented relative to the rim housing 102 such that the cavities 403 align with the protrusions 405. When aligned and assembled, it follows that the apertures 110 provided on the spokes 108 will align with the threaded apertures 212 located at the side edges 211. According to one example, the fasteners 210 may be inserted through the apertures 110 and secured into the threaded apertures 212 to mechanically couple the spokes 108 and the rim housing 102. According to one example, the fasteners 210 and the secondary fastening mechanism 403,405 provide the multi-piece wheel 100 with structural support to withstand operational forces imparted during use. For example, the operational forces may include lateral and torsional forces.

According to one example, a method for rotating the tires includes removing lug nuts (now shown) in a traditional manner to dismount the wheel and tire combination and thereafter removing the fasteners 210 such that the face, may be detached from the rim housing 102. More specifically, the spokes 108 are separated or de-coupled from the rim housing 102. Once the spokes 108 are de-coupled from the rim housing 102, the directional tire may be rotated to the opposite side of the axle and the fasteners 210 may be inserted into the corresponding apertures 212 such that the spokes 108 are coupled to the opposite flange 204,206 of the rim housing 102. This rotation method transfers tire wear to a different side of the tire. For example, this rotation method transfers tire wear to an opposite side of the tire.

According to one example, the description provided herein may be used to enhance tire longevity and performance. Examples are described above with the aid of figures that illustrate implementations of the technology. While the foregoing illustrates and describes examples of this technology, it is to be understood that the technology is not limited to the constructions disclosed herein. The technology may be embodied in other specific forms without departing from its spirit. Accordingly, the appended claims are not limited by specific examples described herein.

What is claimed is:

1. A multi-piece wheel for a vehicle, comprising:
    a rim housing having threaded apertures provided at side edges proximate to an outboard flange and an inboard flange, wherein the threaded apertures are set back substantially a same amount from the outboard and inboard flanges;
    a face that is removably coupled to the rim housing, the face including:
        a bore that centers the face on an axle hub;
        a disk that is concentric with the bore; and
        spokes that are mechanically coupled to the disk and extend outwardly therefrom, the spokes having apertures at an end opposite to the disk that align with the threaded apertures in the rim housing; and
    a fastener that releasably couples the face and the rim housing, the fastener being releasably coupled to the threaded apertures provided proximate to one of the outboard flange or the inboard flange, not both.

2. The multi-piece wheel according to claim 1, wherein the rim housing includes a mounting structure for a tire.

3. The multi-piece wheel according to claim 1, wherein the fastener is dimensioned to pass through the corresponding aperture in the spokes and mechanically engage the threaded apertures provided proximate to one side of the rim housing, not both.

4. The multi-piece wheel according to claim 3, wherein the fastener is a bolt.

5. The multi-piece wheel according to claim 1, wherein the threaded apertures are located on opposite side edges of the rim housing.

6. The multi-piece wheel according to claim 1, wherein a spoke end provided proximate to the rim housing is shaped to match a contour of the rim housing.

7. The multi-piece wheel according to claim 1, wherein the spokes include a surface that extends laterally across an inner edge of the rim housing.

8. The multi-piece wheel according to claim 1, further comprising a secondary fastening mechanism that mechanically engages the spokes and the rim housing.

9. The multi-piece wheel according to claim 8, wherein the secondary fastening mechanism includes a cavity defined at a surface that extends laterally across an inner edge of the rim housing and a protrusion defined at the inner edge of the rim housing.

10. The multi-piece wheel according to claim 8, wherein the secondary fastening mechanism includes a protrusion defined at a surface that extends laterally across an inner edge of the rim housing and a cavity defined in the spokes.

11. A multi-piece wheel for a vehicle, comprising:
    a rim housing having threaded apertures provided at side edges proximate to an outboard flange and an inboard flange, wherein the threaded apertures are set back substantially a same amount from the outboard and inboard flanges;
    a face that is removably coupled to the rim housing, the face including:
        a bore that centers the face on an axle hub;
        a disk that is concentric with the bore; and
        spokes that are mechanically coupled to the disk and extend outwardly therefrom, the spokes having apertures at an end opposite to the disk that align with the threaded apertures in the rim housing;

a fastener that releasably couples the face and the rim housing, the fastener being releasably coupled to the threaded apertures provided proximate to one of the outboard flange or the inboard flange, not both; and a secondary fastening mechanism that mechanically engages the spokes and the rim housing.

12. The multi-piece wheel according to claim 11, wherein the rim housing includes a mounting structure for a tire.

13. The multi-piece wheel according to claim 11, wherein the fastener is dimensioned to pass through the corresponding aperture in the spokes and mechanically engage the threaded apertures provided proximate to one side of the rim housing, not both.

14. The multi-piece wheel according to claim 13, wherein the fastener is a bolt.

15. The multi-piece wheel according to claim 11, wherein the threaded apertures are located on opposite side edges of the rim housing.

16. The multi-piece wheel according to claim 11, wherein a spoke end provided proximate to the rim housing is shaped to match a contour of the rim housing.

17. The multi-piece wheel according to claim 11, wherein the spokes include a surface that extends laterally across an inner edge of the rim housing.

18. The multi-piece wheel according to claim 11, wherein the secondary fastening mechanism includes a cavity defined at a surface that extends laterally across an inner edge of the rim housing and a protrusion defined at the inner edge of the rim housing.

19. The multi-piece wheel according to claim 11, wherein the secondary fastening mechanism includes a protrusion defined at a surface that extends laterally across an inner edge of the rim housing and a cavity defined in the spokes.

20. The multi-piece wheel according to claim 11, wherein the face is interchangeable with a second face having a different pattern.

* * * * *